May 18, 1926.
W. L. NINOW
TRAP
Filed Sept. 23, 1925
1,585,200
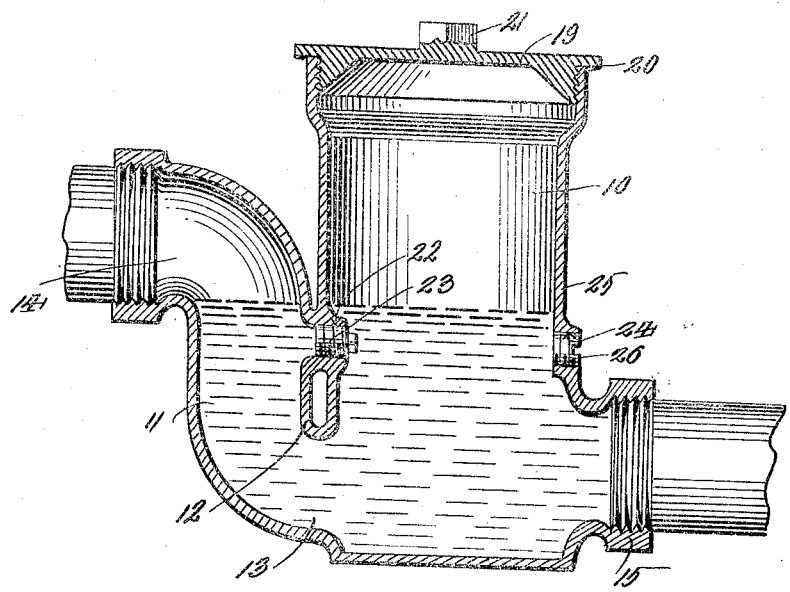
WITNESSES
Inventor
WALTER L. NINOW
By Richard B. Owen
Attorney Patented May 18, 1926.

1,585,200

UNITED STATES PATENT OFFICE.

WALTER L. NINOW, OF CHILTON, WISCONSIN.

TRAP.

Application filed September 23, 1925. Serial No. 58,138.

This invention relates to traps, and has for its object the production of a simple and efficient trap especially adapted for use in connection with waste-pipes for preventing the escape of sewer gases.

Another object of this invention is the production of a simple and efficient trap having a deep water-seal, and having the inlet and outlet openings formed near the bottom of the trap in such a manner as to prevent sewer gas escaping into a room even should the cover be entirely removed from the trap while cleaning.

A further object of this invention is the production of a simple and efficient means for facilitating the cleaning of the trap, should the same become clogged by providing a pair of aligned clean-out openings or ports formed within the casing of the trap, and arranged so as to permit the cleaning tools or wire to be inserted without the necessity of removing the top of the trap or disconnecting the trap from the pipe line.

With these and other objects in view, this invention consists of certain novel construction, combinations and arrangement of parts which will be hereinafter fully described and claimed.

In the drawing:

The figure is a vertical sectional view through the trap.

By referring to the drawing, it will be seen that 10 designates the body of the trap which comprises a substantially vertically arranged tubular body having a vertically extending tubular member 11 formed integral with the body 10 and separated from communication with the body by means of the wall 12. This wall 12 terminates short of the bottom of the body 10 thereby producing an outlet opening 13 between the tubular member 11 and the body 10 as clearly shown in the drawing. This tubular member 11 extends vertically of the body 10 to a point near the top of the body or cylinder 10 and is then turned at right angles therefrom for the purpose of producing an outlet elbow or neck portion 14.

The body 10 is also provided with an integral collar 15 near the lower end thereof upon one side thereof diametrically opposite the tubular member 11 as clearly shown in the drawing, constituting an inlet.

The cover 19 is threaded or otherwise secured in the upper end of the body 10 and this cover 19 is provided with an overhanging flange 20, the flange 20 projecting beyond the sides of the body 10 to facilitate the removal of the cover from the body 10 when it is so desired. A suitable polygonal head 21 is formed upon the top of the cover 19 to facilitate the rotation thereof within the upper end of the body 10 whereby the cover may be threaded into or out of engagement with the body 10.

The wall 12 which is formed between the body 10 and the tubular member 11 is provided with an internally threaded aperture or port 22. A suitable plug 23 may be threaded or otherwise secured within the threaded aperture or port 22, and it is desired to point out that this threaded aperture or port 22 and plug carried thereby are located directly below the water level of the trap or in other words, the aperture 22 is formed in the wall 12 at a point below the lower edge of the discharge or outlet opening formed in the neck 14. Consequently, should the plug 23 become loosened or detached from the port 22 by accident or other inadvertence, the water seal will prevent the escape of gases through the open end of the body 10 should the cover 19 be removed therefrom.

It should be understood that the purpose of the plug 23 is to permit the waste pipe leading from the trap to be cleaned out in case of stoppage by the insertion of a wire or other suitable tool through the port 22 and through the neck 14.

It is desired to reiterate the fact that it is important that the inlet and outlet openings formed in the body 10 be located near the bottom of the body so as to at all times insure the complete water seal within the body of the trap and in this way prevent the escape of sewer gases into a room should the cover 19 be temporarily removed or accidentally displaced from the body 10.

As is clearly shown in the drawing, it will be clearly seen that an additional clean-out port 24 is formed in the side walls 25 of the body 10, this port 24 being internally threaded and being adapted to receive a tap plug 26, which is adapted to be threaded into the port 24 and constitute a closure therefor under normal conditions. This plug 26 is adapted to have its outer end extend flush with the outer end of the port 24 when the plug is in position. This port 24 is in alignment with the aperture 22, and it will be seen that a tool may be inserted through the port 24 and engage the plug 23 for the purpose of unthreading the same and removing this plug from the port 22. It should be further understood that should the trap become clogged, a wire or other tool may be inserted through the ports 24 and 22 so that access might be had to the tubular member 11 or outlets of the trap. It should be understood that the plug 23 may be formed of brass or other suitable material without departing from the spirit of the invention, whereas the plug 26 may be formed of cast iron.

Having described the invention, what is claimed is:

1. A trap of the class described comprising a body provided with an inlet opening and an outlet opening, a vertically extending wall interposed between the inlet and outlet opening, the outlet opening being placed above the inlet opening, said wall being provided with a clean-out port, a plug for normally closing said clean-out port, and the outer casing of said trap being provided with an auxiliary clean-out port in alignment with said clean-out port formed in said wall.

2. As a new article of manufacture a waste pipe trap comprising a body having a vertically extending discharge outlet pipe, the discharge end of which is above the inlet of the aforesaid trap, a vertically extending wall interposed between said outlet and inlet of the trap, said wall provided with an internally threaded aperture, a tap plug normally closing said aperture, and adapted to be removed for the purpose of facilitating the cleaning of the outlet opening, and said body of said trap provided with an internally threaded port in alignment with said port formed in said wall for facilitating the entrance of a tool from the outside of said trap, and a closure plug adapted to normally close the port formed in the wall of said trap.

In testimony whereof I affix my signature.

WALTER L. NINOW.